United States Patent Office.

NATHANIEL THURLOW, OF NIAGARA FALLS, NEW YORK, ASSIGNOR, BY MESNE ASSIGNMENTS, TO THE PORTCHESTER CHEMICAL COMPANY, A CORPORATION OF NEW YORK.

DERIVATIVE OF PINENE AND PROCESS OF PRODUCING SAME.

SPECIFICATION forming part of Letters Patent No. 726,783, dated April 28, 1903.

Application filed December 11, 1901. Serial No. 85,425. (Specimens.)

*To all whom it may concern:*

Be it known that I, NATHANIEL THURLOW, a citizen of the United States, residing at Niagara Falls, in the county of Niagara and State of New York, have invented certain new and useful Improvements in Derivatives of Pinene and Processes of Producing Same, of which the following is a specification.

This invention relates to improvements in the production of derivatives of pinene and also to certain of such derivatives as new products. In my Letters Patent No. 698,761, dated April 29, 1902, I have disclosed a process of making camphor by the action of oxalic acid on turpentine, (pinene,) and in carrying out this process it was found that a number of intermediate products were formed—namely, pinyl oxalate, pinyl formate, borneol oxalate, borneol formate, and polymerization products of pinene. All these products may be regarded as derivatives of pinene, either by substitution, addition, or polymerization. In my said application the process of forming camphor in this manner was claimed, and claim was also made to one of the intermediate products—namely, pinyl formate.

The present application relates to certain matters disclosed but not claimed in said application and relates, further, to a feature of the process not specifically described therein—namely, the production of dipentene. When the pinene is heated with the oxalic acid, a large part of it is polymerized, forming, mainly, dipentene, and in the subsequent distillation this substance passes over first. Dipentene being in itself a commercial article having recognized uses, I arrange to collect this portion of the distillate separately.

The product of the action of oxalic acid on turpentine is a complex oily mass, which constitutes a new product suitable for sale as such and may be used in the manufacture of any or all of its components or derivatives—such as pinyl oxalate, pinyl formate, borneol oxalate and formate, camphor, or dipentene—and the present invention relates also to such mass.

Three hundred and fifty pounds of rectified and dehydrated turpentine are heated with about seventy pounds of anhydrous oxalic acid to a temperature preferably of from 120° to 130° centigrade, although a lower temperature may be used. If a large percentage of oxalate and formate be desired, a low temperature should be used. When the reaction ceases, the resulting oily product contains about two hundred pounds of dipentene, about six per cent. of pinyl formate, about three per cent. of pinyl oxalate, and the remainder consists of free camphor, borneol oxalate and formate, and the higher polymerization products of pinene, with more or less free acid. The next step of the process is to wash the mass with water to remove this free acid. The resultant complex oil may be stored and sold in that condition and serve as a basis for the production of the other products. The specific gravity of this oil is about .902 and boiling-point 185° centigrade. The subsequent treatment may depend on the product which is desired. If oil containing as high a percentage as possible of pinyl oxalate and formate is desired, the oil is distilled at a low temperature and pressure, (78° to 82° centigrade and vacuum of one-half atmosphere.) By successive distillations in this manner the pinyl formate may be increased in the residue or non-distilling portion to about forty-five per cent. and the oxalate to about seven per cent., the rest of the resulting oily liquid being mainly polyterpenes and borneol formate. The distillate consists, mainly, of dipentene, with some borneol oxalate and formate.

For the production of dipentene the oil must be distilled and the distillate collected. The distillation above referred to for the increasing of the pinyl formate and oxalate results also in the production of an impure dipentene as a distillate. The production of this dipentene is, however, advantageously carried on in connection with the production of camphor from the complex oil, and the operation would then be as follows: Enough alkali is added to the oil to saponify all the borneol oxalate and formate present and the mixture then distilled. The borneol oxalate and formate are decomposed, yielding free borneol and a formate or oxalate of the alkali metal, (caustic soda, lime, or baryta.) The first portions of the distillate consists mainly of dipentene, which is separately collected. The later portions of the distillate contain camphor and borneol, mixed with considerable high-boiling oils. The residue in the still consists of alkali salts, with some non-volatile oil. It will be understood that in this heating the pinyl oxalate and formate become broken up, forming camphor and borneol. The first part of the distillate, consisting mainly of dipentene, may be collected and sold as such. The camphor and borneol in the later portion of the distillate are separated from the oily matter therein by freezing, centrifugaling, and washing with cold water, and the product then treated with the proper amount of potassium bichromate and sulfuric acid to oxidize the borneol to camphor. The resulting camphor is then centrifugaled, washed, dried, and sublimed with lime.

The compound pinyl oxalate described herein and the process of making the same are not claimed in this application, but are claimed in my application, Serial No. 118,432, filed August 5, 1902.

Having thus described my invention, the following is what I claim as new therein and desire to secure by Letters Patent:

1. The process of producing dipentene which consists in heating anhydrous turpentine with anhydrous oxalic acid, distilling the resulting product and collecting the distillate containing dipentene.

2. The process which consists in heating anhydrous turpentine with anhydrous oxalic acid, washing the product with water to remove acid, and then distilling and collecting the first portion of the distillate.

3. The process which consists in heating anhydrous turpentine with anhydrous oxalic acid, adding alkali to the resulting product to saponify the ethereal salts present, distilling and separately collecting the first part of the distillate containing dipentene and the later parts containing camphor and borneol.

4. The product consisting of a complex oil containing dipentene, pinyl oxalate, pinyl formate, borneol oxalate, borneol formate and camphor substantially as described, said oil having a boiling-point of about 185° centigrade, a specific gravity of about .902.

NATHANIEL THURLOW.

Witnesses:
H. C. ROLLER,
CHARLES WELLES COIT.